United States Patent Office.

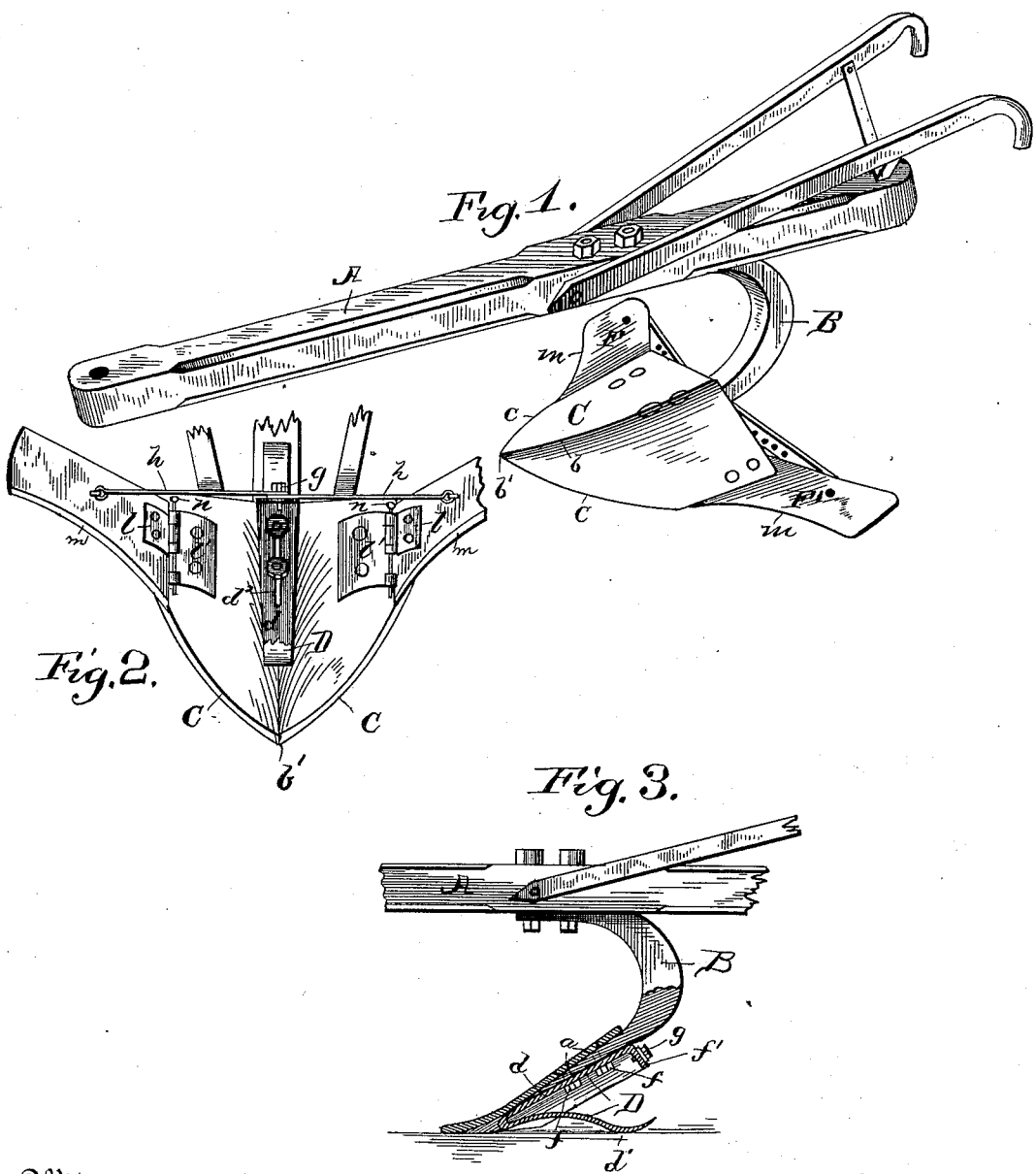

HANS P. NELSON, OF MOORHEAD, MINNESOTA.

PLOW.

SPECIFICATION forming part of Letters Patent No. 387,532, dated August 7, 1888.

Application filed May 14, 1888. Serial No. 273,831. (No model.)

*To all whom it may concern:*

Be it known that I, HANS P. NELSON, of Moorhead, in the county of Clay and State of Minnesota, have invented certain new and useful Improvements in Plows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in cultivating and shovel plows.

The object of my invention is to provide an improved shovel or cultivating plow which shall be extremely simple and cheap in construction, composed of a minimum number of parts, and provided with an improved landside or shoe for regulating the depth to which the shovel or blade penetrates, and with vertically and laterally adjustable weed-cutting blades or wings hinged to each side of the shovel-blade and provided with rods pivoted to the rear sides of the wings, whereby the same are adjusted to cut deep or shallow or to throw the earth at a greater or less distance on each side.

With these ends in view my invention consists in certain novel features of construction and combinations of parts, more fully described hereinafter, and particularly pointed out in the claim.

Referring to the accompanying drawings, Figure 1 is a front perspective view of the complete device illustrating the form of the shovel-blade, the curved standard, and the adjustable wings or weed-cutting blades. Fig. 2 is a rear view of the shovel-blade, adjustable wings, and brace-rods, whereby the wings are adjusted, the heel of the supporting-shoe or landside being broken away to show the slot in the upper portion of the shoe and the bolts passing through the same, whereby the shoe can be raised or lowered, thereby regulating the depth to which the shovel-blade enters; and Fig. 3 is a partial vertical section showing one side of the shovel-blade, the peculiar form of the landside or shoe, and the manner of securing the same and the shovel-blade to the curved standard.

In the drawings, the reference-letter A indicates the usual plow-beam provided with suitable handles at the rear. A curved standard, B, is bolted or otherwise secured at its upper end to the plow-beam, and from thence curves rearwardly, downwardly, and forwardly, and its lower end, which projects forwardly and downwardly, is slightly flattened, as shown, and is provided with one or more transverse bolt-holes, $a$. A shovel-blade, C, is secured to the front side of the lower end of the standard and projects forwardly from the same, and is provided with one or more apertures registering with said openings in the standard, and said blade is formed in one piece, slightly V-shaped in cross section at its upper portion, but is gradually flattened out and narrowed down to the point $b'$ at its lower end. Thus the front side of the blade is provided with a central longitudinal edge, $b$, extending from its point to its top, and its point $b'$ projects forwardly and is slightly flattened and provided with the horizontal knife-edges $c\ c$, extending rearwardly in opposite directions from each side of the point, said edges being adapted to cut or scrape just beneath the surface of the soil or sod. A landside or shoe, D, is secured to the lower end of the standard beneath the shovel-blade, and is preferably composed of a flat bar of iron bent or formed V shape, one arm, $d$, extending upwardly and rearwardly and bearing against the under side of the flat end of the curved standard; and said arm $d$ is provided with a longitudinal slot, $d^2$, registering with said apertures in the curved standard and shovel-blade; and said blade and shoe are secured in position and to the standard by means of one or more bolts, $f$, each provided with a suitable nut bearing against the inner side of the arm $d$. Thus it will be seen that by loosening the nuts the shoe can be raised or lowered and clamped in position when at the desired adjustment. The upper end of the arm is bent laterally to form a downwardly-extending projection, $f'$, which is provided with an opening or aperture for the purpose hereinafter appearing. The opposite arm or heel, $d'$, of the shoe or landside extends rearwardly and horizontally, so that its lower side will bear upon the ground and be in or about the same plane with the point of the shovel-blade. Thus it will be readily seen that the landside or shoe will steady the plow when in operation and accurately regulate the depth of the cut.

The wings or cutting-blades F F' are shaped like mold-boards and are provided with sharp lower edges, $m\ m$, which form continuations rearwardly and outwardly of the edges $c\ c$ of the shovel-blade, and said wings are hinged to the under side of the shovel-blade—one on each side and extending laterally from the same—and are so arranged as to be capable of up-and-down or backward-and-forward adjustment, so that they will work a wide or narrow or deep or shallow furrow; and each wing is provided on its inner side near its outer end with an eye, and a pair of brace-rods, $h\ h$, are loosely secured to said eyes at one end, and at their opposite ends are provided with a series of apertures, which ends are adapted to overlap and rest upon the upper rearwardly-extending projection, $f''$, of the upper arm of the landside, with an aperture in each rod registering with the aperture in said projection, and said rods are adjustably held in position and secured to said projection by a bolt, $g$, provided with a thumb-nut. Thus by passing the bolt $g$ through different corresponding apertures in the brace-rods the wings are adjusted forwardly or backwardly and held in the desired position.

The hinges which secure each wing to the opposite sides of the shovel-blade are each composed of a leaf or wing, $l$, secured to the inner side of the end of a wing or blade, and provided with an eye extending beyond the edge of the same, and the opposite leaf or wing of the hinge is secured to the under side of the shovel-blade near one edge, and is provided with eyes so arranged that the eye of the leaf $l$, carried by its cutting-blade, can be inserted between and made to register with said eyes of leaf $l'$ at various vertical heights, and the eyes are held registering and the leaves pivoted together by a removable pin, $n$. Thus the wings can be adjusted to make a deeper or shallow cut, as desired.

The herein-described device when put to use does not turn a furrow, but scoops up the soil and hills a growing crop, while the wings or cutting-blades cut the weeds and throw the earth laterally to form the hills; and the device is also very effective in doing various kinds of work, as it will not clog when used where the soil is wet, or where there are weeds or coarse manure, on account of the flatness and sharp edges of the shovel and wings and the curved standards.

What I claim is—

The combination of the standard, the shovel-blade, a vertically-adjustable V-shaped shoe, one arm forming the horizontal rearwardly-extending heel and the other arm extending along the standard and having a longitudinal slot, a perforated projection extending rearwardly from the upper portion of the shoe, bolts passing through the shovel-blade, standard, and shoe, the cutting-wings hinged to the under side of said blade, and brace-rods pivoted to said wings and adjustably secured to said projection of the shoe, whereby the wings can be adjusted backward and forward, as set forth.

In testimony that I claim the foregoing as my own I affix my signature in presence of two witnesses.

HANS P. NELSON.

Witnesses:
WM. R. TILLOTSON,
GEO. N. LAMPHERE.